US007551740B2

(12) United States Patent
Lee et al.

(10) Patent No.: US 7,551,740 B2
(45) Date of Patent: Jun. 23, 2009

(54) WEIGHTED SECRET SHARING AND RECONSTRUCTING METHOD

(75) Inventors: Kyung-hee Lee, Yongin-si (KR); Tae-chul Jung, Seongnam-si (KR); Evgeny Krouk, St. Petersburg (RU); Sergey Bezzateev, St. Petersburg (RU); Evgeny Linsky, St. Petersburg (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 627 days.

(21) Appl. No.: 10/960,278

(22) Filed: Oct. 8, 2004

(65) Prior Publication Data

US 2005/0111657 A1 May 26, 2005

(30) Foreign Application Priority Data

Oct. 8, 2003 (KR) ............ 10-2003-0070026

(51) Int. Cl.
*H04L 9/00* (2006.01)
(52) U.S. Cl. .......... 380/278; 380/28; 380/259; 380/277; 380/286; 714/100
(58) Field of Classification Search ........ 380/278, 380/277, 259, 28
See application file for complete search history.

(56) References Cited

U.S. PATENT DOCUMENTS

| 4,682,333 | A | * | 7/1987 | Onishi et al. ............ 714/755 |
| 5,987,129 | A | * | 11/1999 | Baba ..................... 380/279 |
| 6,173,400 | B1 | * | 1/2001 | Perlman et al. ......... 713/172 |
| 6,625,775 | B1 | * | 9/2003 | Kim ..................... 714/755 |
| 6,707,397 | B1 | * | 3/2004 | Lin ...................... 341/67 |
| 2002/0164033 | A1 | * | 11/2002 | Rajasekaran ........... 380/278 |
| 2003/0147535 | A1 | * | 8/2003 | Nadooshan et al. ..... 380/277 |
| 2003/0233573 | A1 | * | 12/2003 | Phinney ................. 713/200 |
| 2004/0001605 | A1 | * | 1/2004 | Venkatesan et al. .... 382/100 |

FOREIGN PATENT DOCUMENTS

JP 2002-140631 5/2002

OTHER PUBLICATIONS

Roth, R.M., Siegel, P.H., "Lee-metric BCH codes and their application to constrained and partial-response channels," IEEE Transactions Information Theory. vol. 40, No. 4, pp. 1083-1096, Jul. 1994.*
Wu, X.-W., Kuijper, M., and Udaya, P., "Lower bound on minimum Lee distance of algebraic-geometric codes over finite fields," Electronic Letters, vol. 43, No. 15, pp. 820-821, Jul. 19, 2007.*
Bezzateev et al., "Generalized Goppa codes for correcting localized errors", Cambridge, MA, USA, Aug. 16-21, 1998 (1 pg) (in English).
Shigeo et al., "Cryptogram and Information Security", Shokodo Co., Ltd., pp. 125-126, 1990 (3 pgs).

* cited by examiner

*Primary Examiner*—Christopher A Revak
*Assistant Examiner*—Sarah Su
(74) *Attorney, Agent, or Firm*—Staas & Halsey LLP

(57) ABSTRACT

A weighted secret sharing and reconstructing method includes encoding the secret using a predetermined code, producing voices so that different weights are assigned to errors in an error vector according to locations of the errors, encrypting the encoded secret using the error vector and distributing the encrypted encoded secret to a plurality of participants.

16 Claims, 7 Drawing Sheets

WEIGHTED SECRET SHARING AND RECONSTRUCTING METHOD

CROSS-REFERENCE TO RELATED APPLICATIONS

This application claims the priority of Korean Patent Application No. 2003-70026 filed on Oct. 8, 2003 in the Korean Intellectual Property Office, the disclosure of which is incorporated herein in its entirety by reference.

BACKGROUND OF THE INVENTION

1. Field of the Invention

The present invention relates to a weighted secret sharing and reconstructing method, and more particularly, to a method of sharing and reconstructing a secret using a weighted error vector.

2. Description of the Related Art

When there are a set R of N participants and a set L of subsets of the N participants, a threshold secret sharing scheme distributes shares of a secret to the N participants and allows the secret to be reconstructed when subsets of participants belong to the set L.

An ideal threshold secret sharing scheme has the following characteristics: (i) all participants must take part in key agreement of the set R; (ii) a master private key of the set R is not disclosed to all the participants; (iii) at least a predetermined number (i.e., a threshold) of participants must participate in a process of decrypting a message encrypted by the master private key; (iv) at least a predetermined number (i.e., a threshold) of participants must participate in a signature procedure of the message using the master private key; (v) after setting the scheme, the process of decryption or signature of the message by the participants whose subsets belong to the set L is non-interactive; and (vi) the master private key or a public key shall not be changed even when a new participant is included in the set R or a participant belonging to the set R leaves the set R.

A (k,N) threshold secret sharing scheme is another example of the threshold secret sharing scheme. The (k,N) threshold secret sharing scheme allows a secret to be reconstructed when k of N dispersed secret shares are collected. FIG. 1 illustrates a a conventional (k,N) threshold secret sharing scheme. Referring to FIG. 1, a secret 10 is divided into secret shares with equal importance and distributed to N participants 11. The secret 10 is reconstructed by collecting the secret shares of at least three of the N participants, combining them (see reference numeral 12), and reconstructing a secret 13.

However, the (k,N) threshold secret sharing scheme is disadvantageous in that at least k secret shares are required to reconstruct a secret since N secret shares with equal importance are distributed to N participants. For instance, it is impossible to completely reconstruct the secret when (k−1) secret shares are collected and combined.

Alternatively, a hierarchical threshold secret sharing scheme, which is yet another example of the threshold secret sharing scheme and allows each level of a multi-level structure to share a secret, needs to give a hierarchical grant to a participant who desires to access the multi-level structure.

SUMMARY OF THE INVENTION

The present invention provides a weighted secret sharing and reconstructing method in which secret shares with different weights are distributed to participants, so that a secret may be completely reconstructed even when (k−1) secret shares are collected and combined.

According to an aspect of the present invention, a method of sharing a secret, includes encoding the secret using a predetermined code, producing voices so that different weights are given to errors in an error vector according to locations of the errors, encrypting the code using the error vector, and distributing a result of encryption to a plurality of participants.

According to another aspect of the present invention, a method reconstructs a secret distributed to participants after encoding the secret using a predetermined code, generating voices so that different weights are given to errors in an error vector according to locations of the errors, and encrypting the code using the error vector. The method includes determining a number of voices required to decode the code, selecting a part of participants according to the determined number of voices, collecting the secret from the selected participants, and reconstructing the secret by decrypting and error-correction decoding the secret.

According to yet another aspect of the present invention, a method of sharing and reconstructing a secret includes encoding the secret using a predetermined code, producing voices so that different weights are given to errors in an error vector according to locations of the errors, encrypting the code using the error vector and distributing a result of encrypting to participants; determining a number of voices required to decode the code; selecting parts of the participants by the determined number of voices; collecting the secret from the selected participants, and reconstructing the secret by decrypting and error-correction decoding the secret.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
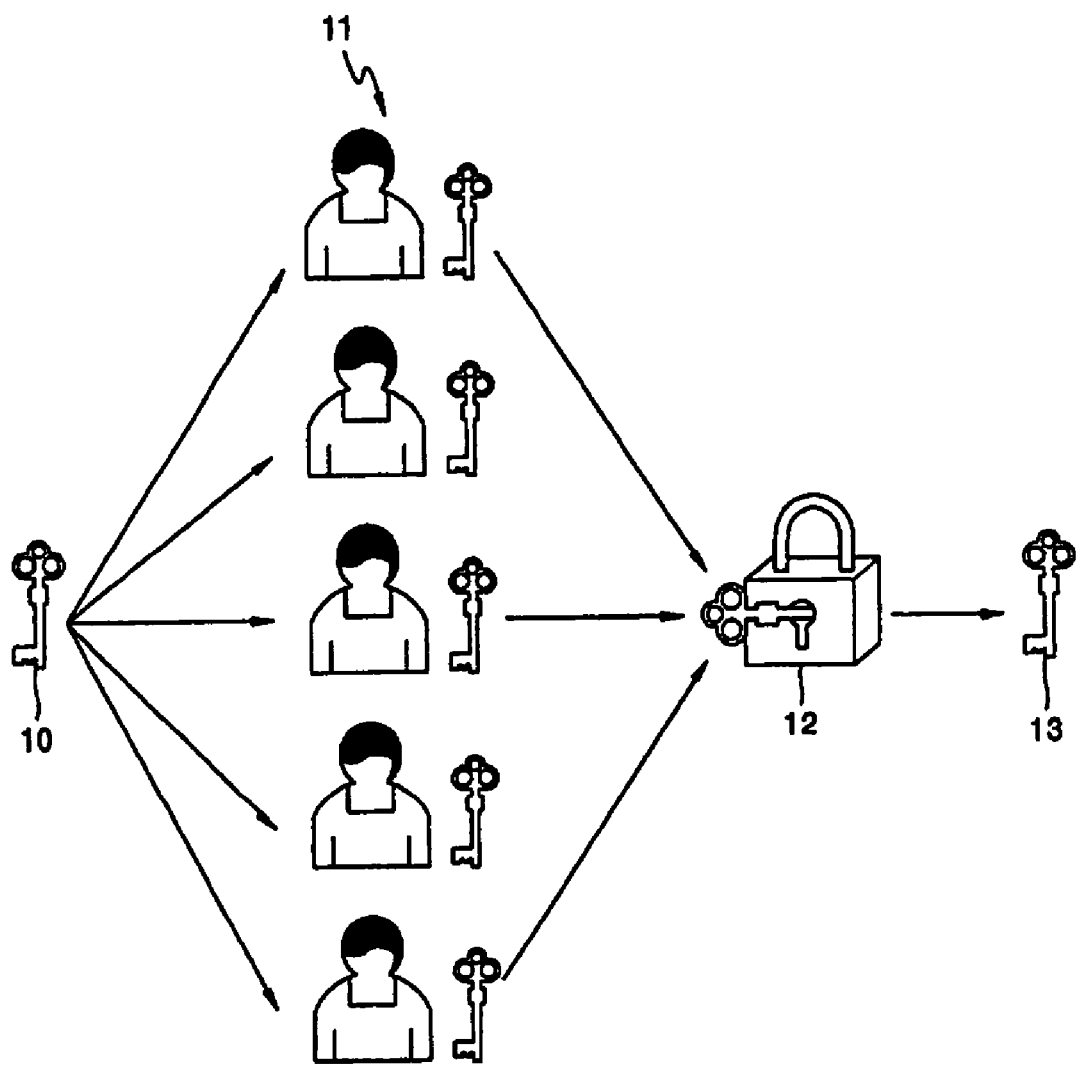
FIG. 1 is a schematic representation of a conventional (k,N) threshold secret sharing scheme.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
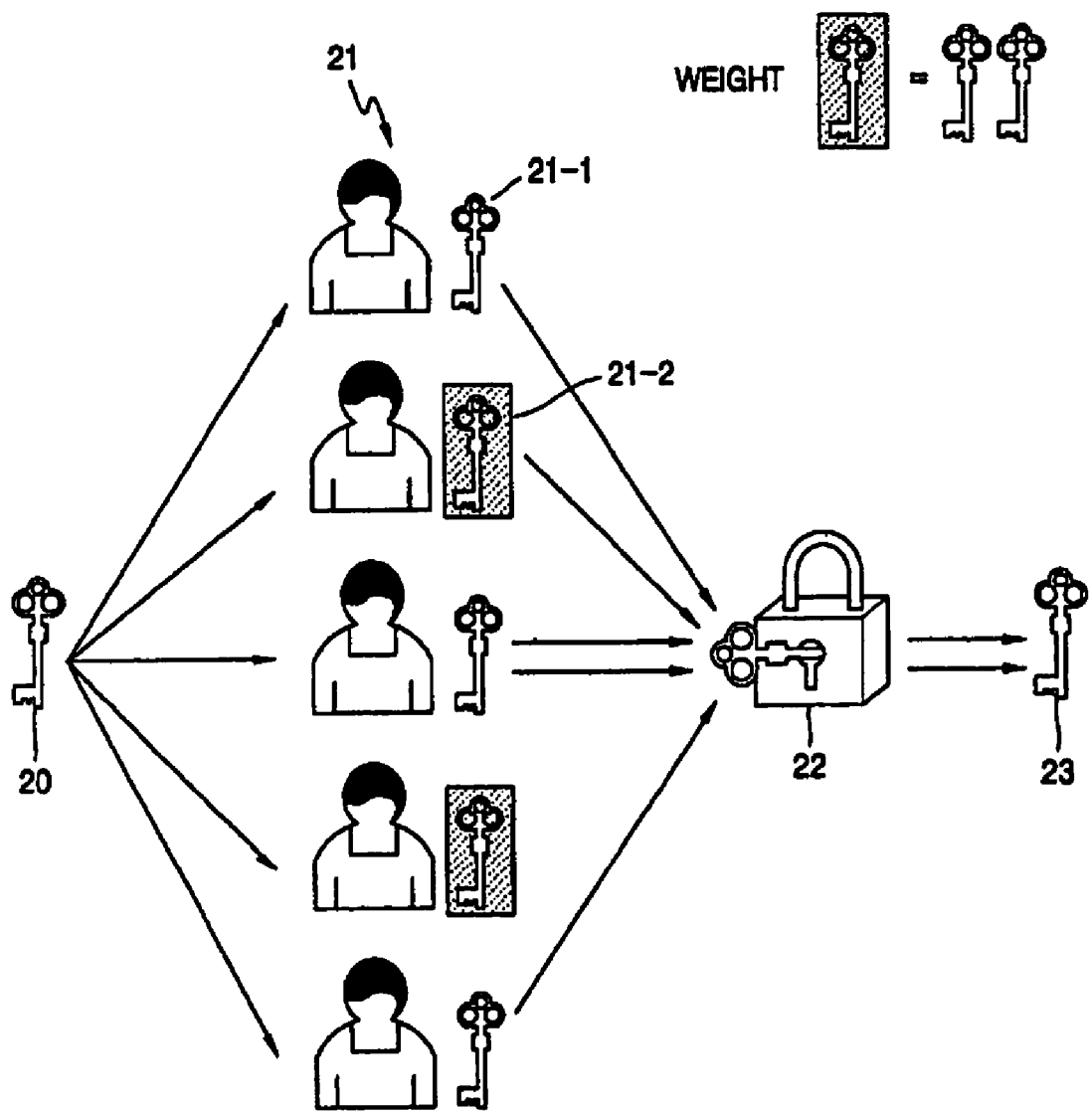
FIG. 2 is a schematic representation of a (K,N) weighted threshold secret sharing method according to an embodiment of the present invention.

FIG. 2 is a schematic representation of a (K,N) weighted threshold sharing and distributing method according to an embodiment of the present invention. Referring to FIG. 2, a secret 20 is divided into secret shares with different weights and distributed to N participants 21. The secret 20 is reconstructed as a secret 23 either by collecting secret shares from two participants of the N participants 21, wherein one the participants has a weighted secret share, and combining the collected secret shares 22 or by collecting non-weighted secret shares from three participants and combining the collected secret shares 22.

More specifically, a secret S is divided into N secret shares, and the N secret shares are distributed to N participants who are interlinked via a channel, respectively. The secret S is encrypted using an error vector e and distributed, according to the McEliece technique.

Every participant may access the secret S. A weight (wt) $\tau_i$ (i=1, 2, 3 ..., N) is given to a secret share $s_i$ according to a location i in the error vector.

$$T = \sum_{i=1}^{N} \tau_i, \quad (1)$$

wherein T denotes a total of weights given to the error vector.

According to the McEliece technique, when one of participants who receives the secret shares desires to reconstruct the secret S, the participant reconstructs the secret S using his/her secret share and (K−1) secret shares. In this case, weights given to the secret shares may be expressed as follows:

$$\sum_{i=1}^{N} \tau_i \geq k, \quad (2)$$

wherein k denotes a minimum number of secret shares required to reconstruct the secret S.

To reconstruct the secret S, one of the N participants collects (K−1) encrypted secret shares from K−1 participants via a public communication channel. Next, the participant reconstructs the secret S by combining his/her secret share with the collected (K−1) secret shares and decrypting a result of the combination.

To encrypt and decrypt the secret S, the present invention uses a generalized Goppa code. The q-ary generalized Goppa code with a length n is defined by an n-type vector $\alpha = (\alpha_1 \alpha_2 \ldots \alpha_n)$ as follows:

$$\sum_{i=1}^{n} a_i \frac{V_i(x)}{U_i(x)} \equiv 0 \bmod g(x), \quad (3)$$

wherein $a_i \in GF(q)$, a locator set $$L = \left\{ \frac{V_i(x)}{U_i(x)} \right\}_{i=1}^{n}$$

wherein $V_i(x)$ and $U_i(x)$ are polynomials over $GF(q^m)$. Here, $GCD(U_i(x), V_i(x))=1$, deg $V_i(x)<$ deg $U_i(x)$, and $GCD(U_i(x), U_j(x))=1$ for all i≠j. GCD denotes a greatest common measure, deg denotes a greatest degree of a polynomial, and g(x) denotes a Goppa polynomial over $GF(q^m)$, satisfying GCD $((U_i(x), g(x))=1$ for i that ranges from 1 to n.

The generalized (L,g) Goppa code has a minimum distance of $d_0 \geq d$ when d satisfies following Equation (4):

$$\deg g(x) > (d-2)r + s \quad (4),$$

wherein $r=$deg $U_i(x)$ and $s=$deg $V_i(x)$.

In the generalized Goppa code for enabling error correction, a locator set L may be determined with respect to the Goppa polynomial G(x), as follows:

$$L = \bigcup_{j=1}^{l} \{R_i^{(j)}\}_{i=1}^{n_j}, \quad n = \sum_{j=1}^{l} n_j, \quad (5)$$

wherein $R_i^{(j)}$ is a rational function and may be expressed as follows:

$$R_i^{(j)} = V_i^{(j)}(x)/U_i^{(j)}(x) \quad (6),$$

wherein deg $V_i^{(j)}(x)=r_i$, deg $U_i^{(j)}(x)=\tau_i$, and $(V_i^{(j)}(x), U_r^{(k)}(x))=1$ with respect to arbitrary values i, j, k, and r.

If a vector $a=(a_1^{(1)}a_2^{(1)} \ldots a_{n_1}^{(1)}a_1^{(2)}a_2^{(2)} \ldots a_{n_2}^{(2)}a_1^{(l)}a_2^{(l)} \ldots a_{n_l}^{(l)})$ is a codeword of the generalized (L,g) Goppa code with a length of $n=n_1+n_2+\ldots+n_l$, the Goppa polynomial g(x) and locator set L must satisfy following Equation (7):

$$\sum_{i=1}^{l} \sum_{i=1}^{n_j} a_i^{(j)} \frac{V_i^j(x)}{U_i^{(j)}(x)} \equiv 0 \bmod g(x), \quad (7)$$

For the generalized Goppa code, it is possible to estimate its minimum distance. Using the generalized Goppa code with the Goppa polynomial g(x) and the locator set L, it is possible to correct an arbitrary error set $T=\{t_1, t_2, \ldots, t_l\}$ that satisfies following Equation (8) with respect to the respective code blocks $a_1^{(1)}a_2^{(1)} \ldots a_{n_l}^{(1)}$:

$$(\deg g(x))/2 \geq t_1\tau_1 + t_2\tau_2 + \ldots + t_l\tau_l \quad (8),$$

wherein $t_1, t_2, \ldots,$ and $t_l$ denote numbers of errors contained in the code blocks with lengths of $n_1, n_2, \ldots,$ and $n_l$, respectively.

In the case of a generalized binary Goppa code, (deg g(x))/2 presented in Equation (8) is converted into (2 deg g(x))/2.

It is assumed that there is generalized Goppa code of (36, 18, 7) where $n_1=8$, $n_2=28$ and the Goppa polynomial is $g(x)=x^6+x+\alpha^3$, if $\alpha \in GF(2^3)$.

In connection with the code block of the length $n_1$, we will use a function of first degree as follows:

$$U_i^{\{1\}}=1/(x-\alpha_i), i=1,\ldots,n_1, \alpha_i \in GF(2^3), \alpha_8=0 \quad (9)$$

In connection with the code block of the length $n_2$, we will use second-degree polynomials, which are irreducible over $GF(2^3)$, with coefficients belonging to $GF(2^3)$, as follows:

$$\{U_{1i}^{(2)}(x), U_{2i}^{(2)}(x), U_{3i}^{(2)}(x), U_{4i}^{(2)}(x)\}_{i=1,\ldots,7} \quad (10),$$

where $U_{1i}^{(2)}(x)=(\alpha^i x)^2+\alpha^5(\alpha^i x)+\alpha^3$, $U_{2i}^{(2)}(x)=(\alpha^i x)^2+\alpha^5(\alpha^i x)+\alpha^4$, $U_{3i}^{(2)}(x)=(\alpha^i x)^2+\alpha^6(\alpha^i x)+\alpha^9$, and $U_{4i}^{(2)}(x)=(\alpha^i x)^2+\alpha^3(\alpha^1 x)+\alpha$.

$d \geq 7$ is obtained by Equation (4) and the binary generalized Goppa code allows correction of an error set $T=\{t_1, t_2\}$ that satisfies $(2 \deg g(x))/2 \geq t_1+2t_2$. Ranges of $t_1$ and $t_2$ are shown in Table 1.

TABLE 1

| $N_1 = 8$<br>$t_1$ | $N_2 = 28$<br>$t_2$ | total length n = 36<br>total number of correctable errors t |
|---|---|---|
| 0 | $\leq 3$ | $\leq 3$ |
| $\leq 2$ | $\leq 2$ | $\leq 4$ |
| $\leq 4$ | $\leq 1$ | $\leq 5$ |
| $\leq 6$ | 0 | $\leq 6$ |

When the generalized Goppa code has a locator set of a third degree polynomial, it is possible to correct an error set $T=\{t_1, t_2, t_3\}$ that satisfies $(2 \deg g(x))/2 \geq t_1+2t_2+3t_3$, using the generalized Goppa code with a length of $n=n_1+n_2+n_3$.

A threshold secret sharing method adopting using a public key scheme, according to the present invention, may be realized using the Goppa code. In the method, an error vector e is known to all participants. Also, by properly selecting code parameters, the (K,N) threshold secret sharing scheme is realizable, where N=wt(e). Error correcting code may allow (d−1) or less errors to be corrected. Accordingly, a number of participants required to reconstruct a secret is at least K that satisfies wt(e)−K (d−1)/2, i.e., 2K 2 wt(e)−d+1. The minimum distance is $d \leq \deg g(x)+1$ when using Goppa code, and the minimum distance is $d \leq 2(\deg g(x))+1$ when using binary Goppa code with a separable Goppa polynomial g(x).

There may be a situation in which some of the participants who are taking part in secret decryption provide wrong values of their secret shares. For instance, when $k_1$ participants provide correct values of their secret shares, and $k_2$ participants provide wrong values of their secret shares, this situation may be expressed as follows:

$$wt(e)-k_1+k_2 \leq (d-1)/2$$

$$2k_1-2k_2 \geq 2wt(e)-d+1 \quad (11)$$

The above scheme may be generalized for a case wherein participants have different numbers of voices. Here, a voice is differentiated from a share, and a plurality of voices may be allocated to a secret share.

For instance, when using the generalized Goppa code for correcting errors, a number of voices allocated to the participants may be determined by the degree of a locator. The degree of the locator corresponds to a location j of an error in the error vector e and is known to the participants. In a case of using the generalized Goppa code, the (k,T) or (K,N) weighted secret sharing scheme may be realized according to the following conditions.

In the (k,T) or (K,N) weighted secret sharing scheme, T denotes a total number of voices used in the scheme and is equivalent to a weight given to the error vector e. That is, $T=t_1\tau_1+t_2\tau_2+\ldots+t_j\tau_j$. Here, $t_i$ denotes a number of non-zero values of the error vector e that corresponds to locations of locator polynomials with a degree of $\tau_i$. N denotes a number of the participants that is equal to a sum of $t_1, t_2, \ldots,$ and $t_j$. k denotes a minimum number of voices required for secret reconstruction that is equal to a sum of $t_1\tau_1, t_2\tau_2, \ldots,$ and $t_j\tau_j$. $k_i$ denotes a number of participants with voices of $\tau_i$ that is equal to or larger than T−(deg g(x))/2. In the case of the binary Goppa code with a separable Goppa polynomial, k T−(deg g(x)). K denotes a minimum number of participants required for secret reconstruction wherein the minimum number is equal to a sum of $k_1, k_2, \ldots,$ and $k_j$.

Hence, according to an embodiment of the present invention, k voices, rather than k secret shares, are required to reconstruct a secret, and participants may have different numbers of voices. A size of a secret share is not related to a weight or a number of voices.

Figure 3:
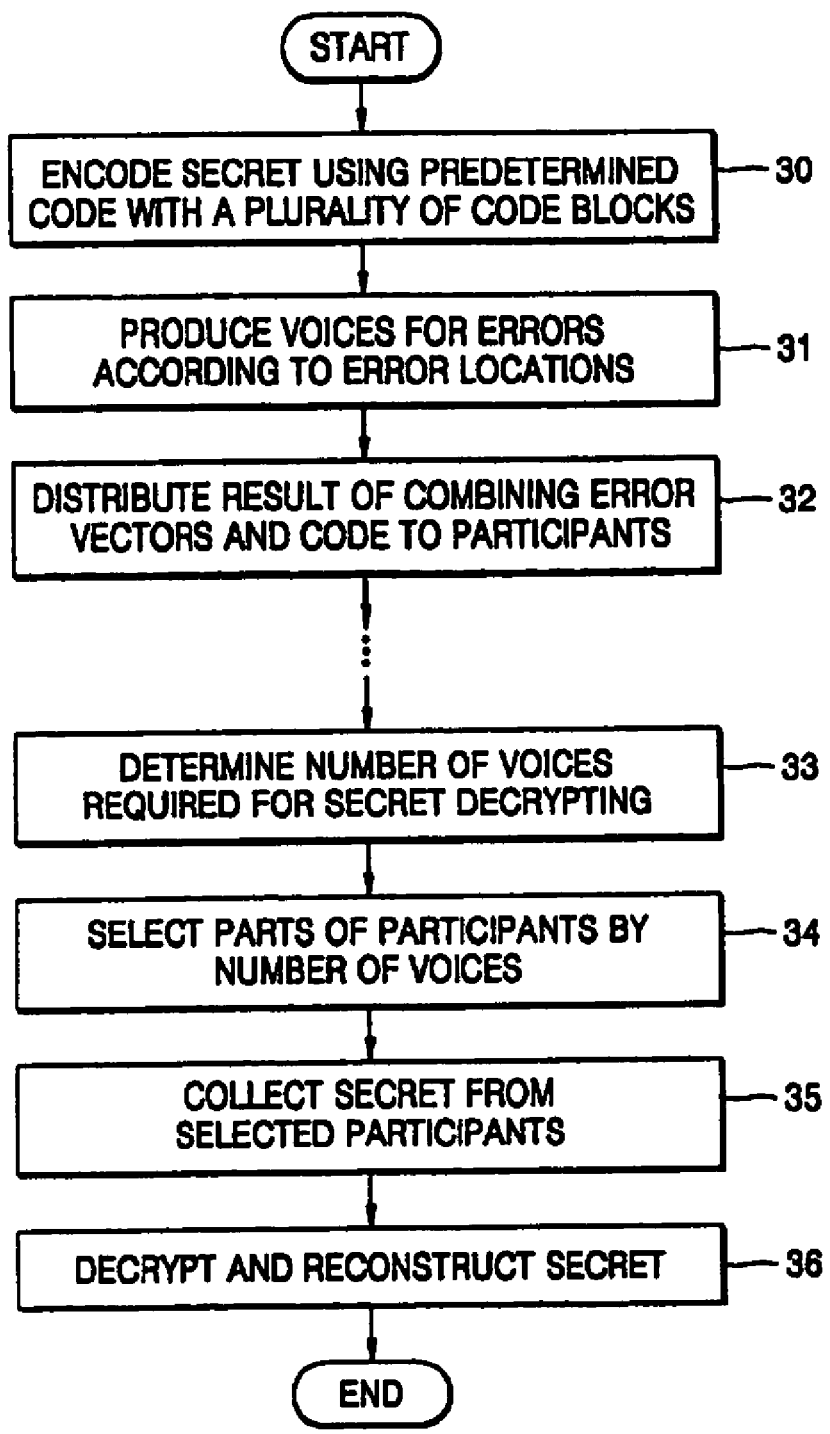
FIG. 3 is a flowchart illustrating a method of sharing and reconstructing a secret, according to an embodiment of the present invention.

FIG. 3 is a flowchart illustrating a method of sharing and reconstructing a secret according to an embodiment of the present invention. Referring to FIG. 3, the secret is encoded using an error correcting code, preferably, the generalized Goppa code (operation 30). Then, code in which a plurality of code blocks with different lengths are concatenated together, similarly to code blocks determined by a locator set of the generalized Goppa code, is obtained. Next, voices are produced for error locations of error vectors which correspond to the respective code blocks (operation 31). The error vectors have different voices according to the error locations of errors in the code blocks obtained in operation 30. For instance, when a length n of the code obtained in operation 30 is a sum of $n_1$ and $n_2$, a voice of 1 is allocated to errors corresponding to $n_1$ in error vectors and a voice of 2 is allocated to errors corresponding to $n_2$ in error vectors. The error vectors are then added to the code obtained in operation 30, and the result of addition is encrypted. The result of encryption is distributed to N participants (operation 32). Here, N=wt(e).

To reconstruct the secret, a number (k, T) of voices required to decode the secret is determined (operation 33). Next, a number $k_i$ of participants is determined by the number (k, T) of voices (operation 34). For instance, if (k, T) is (5, 11), $t_1=7$ and $t_2=2$ when N=9. Thus, $(k_1, k_2)$ may be one of (1,2), (3,1), and (5,0) since $k_1+2k_2=k$. Each combination of (1,2), (3,1), and (5,0) corresponds to (K=3, N=9), (K=4, N=9), and (K=5, N=9), respectively.

After determining the number $k_i$ of participants, the secret is reconstructed by collecting secret shares from the number $k_i$ of participants (operation 35), and decrypting and error-correcting decoding the collected secret shares (operation 36).

FIGS. 4 through 7 are schematic representations illustrating weighted secret sharing and reconstructing methods according to embodiments of the present invention.

Figure 4:
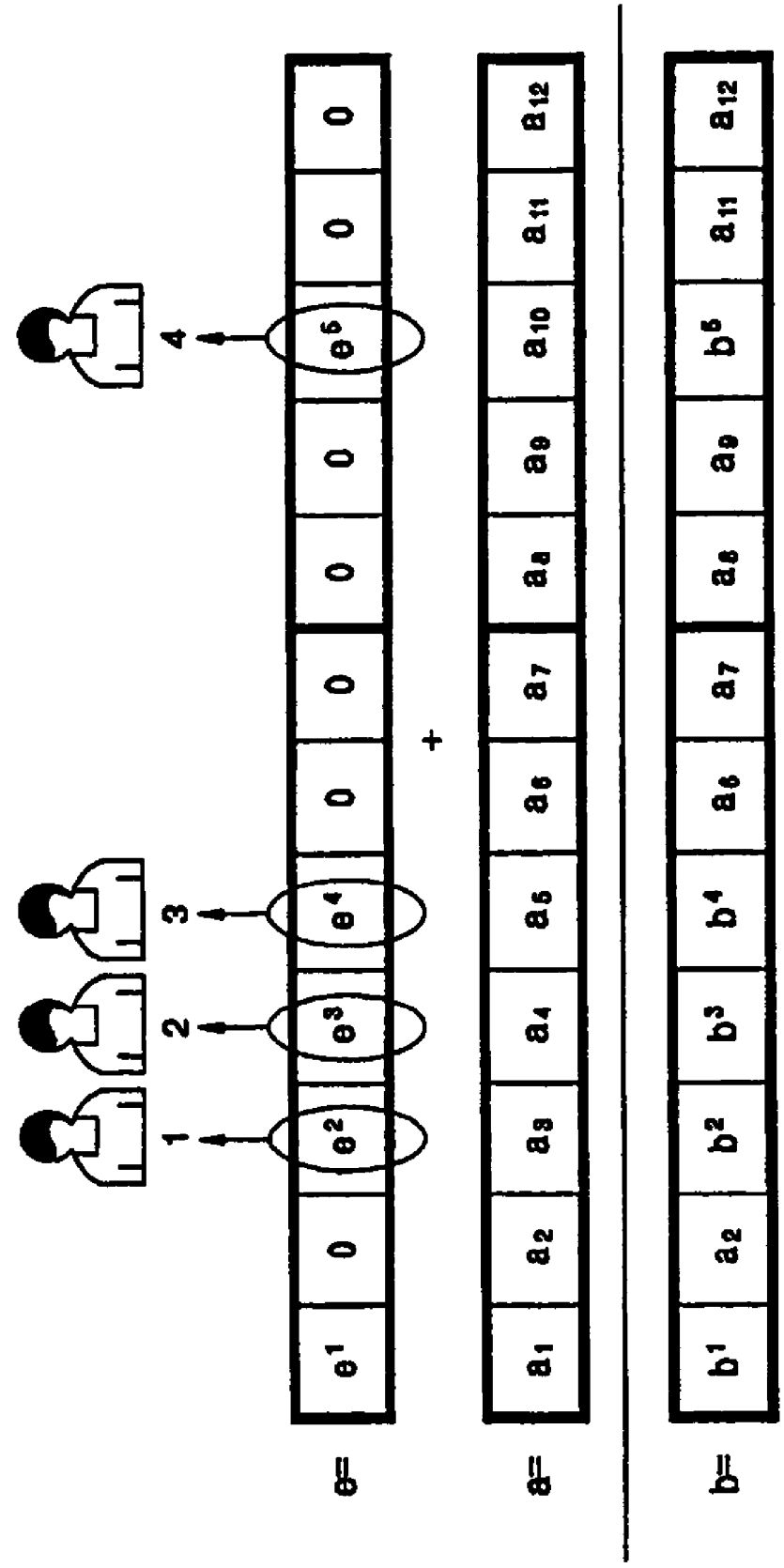
FIG. 4 is a schematic representation illustrating a method of encrypting a secret in accordance with an embodiment of the present invention when a weight enabling error correction is 3.

In detail, FIG. 4 illustrates a method of encrypting a secret when a weight for error correction is set to 3. It is assumed that a left codebook outlined with a thick line indicates a code block when a voice is 1, and a right codebook outline with a thick line indicates a code block when a voice is 2. In FIG. 4, a, e, and b represent results of encoding the secret, an error vector, and a result of encrypting the secret.

Figure 5:
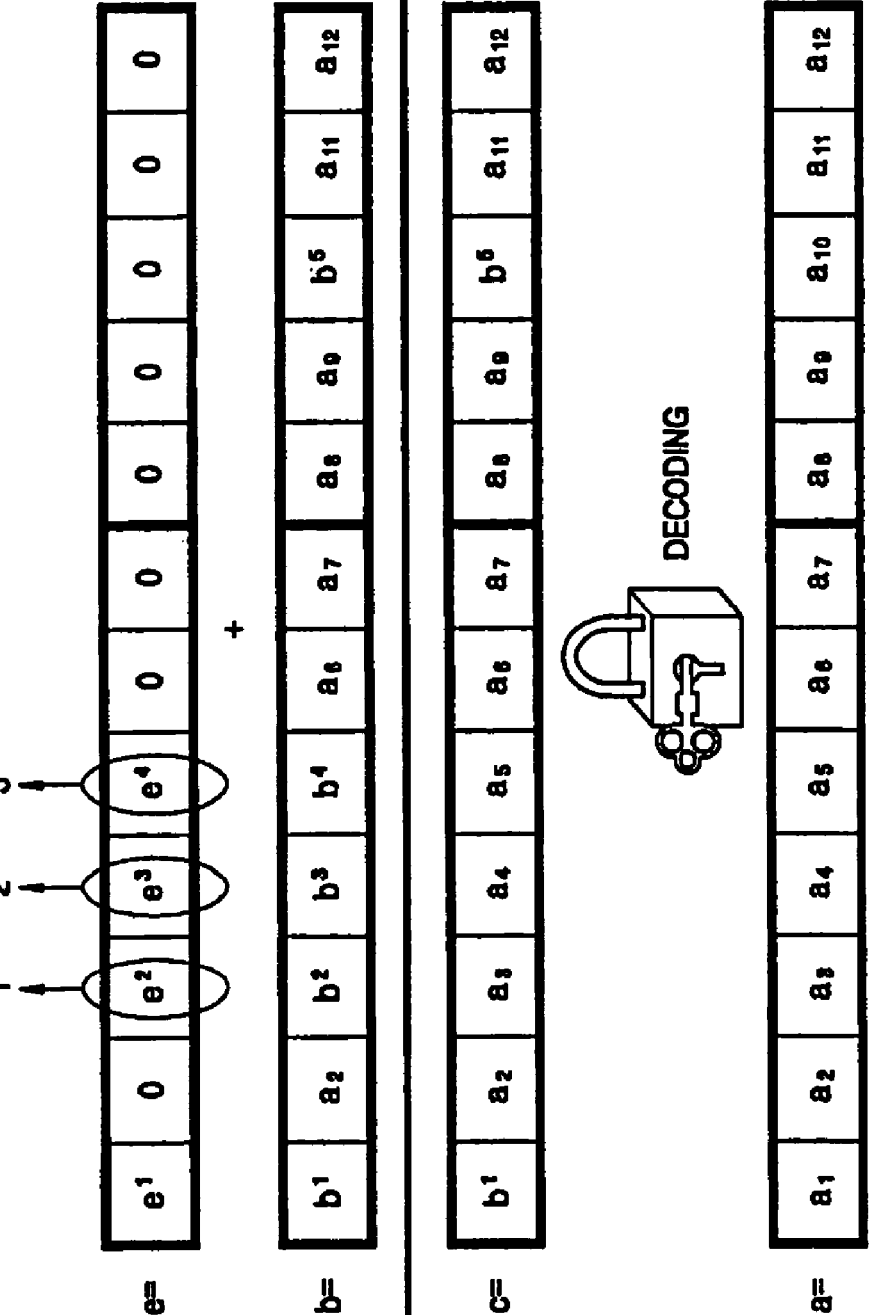
FIG. 5 is a schematic representation illustrating a method of collecting shares of a secret from three participants whose voices are 1, respectively, and reconstructing the secret, according to an embodiment of the present invention.

FIG. 5 illustrates a method of restoring a secret from three participants who each hold a voice, respectively, and reconstructing the secret, according to an embodiment of the present invention. Referring to FIG. 5, a result c of decrypting the secret collected from the three participants contains an error with a voice of 1 and an error with a voice of 2. Next, the secret may be reconstructed by decoding the result c using an error correction and decoding algorithm.

Figure 6:
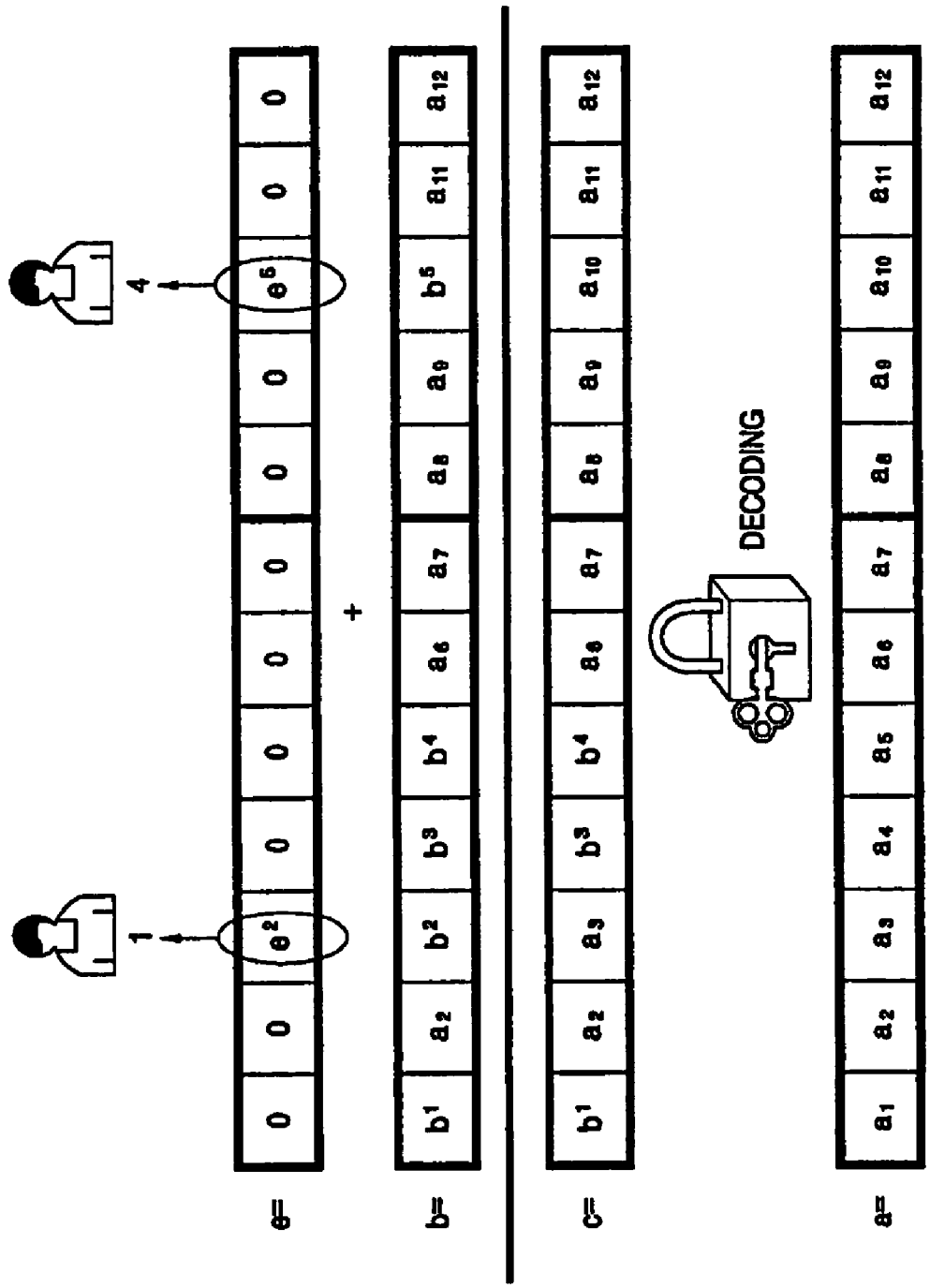
FIG. 6 is a schematic representation illustrating a method of collecting shares of a secret from two participants whose voices are 1 and 2, respectively, and reconstructing the secret, according to an embodiment of the present invention.

FIG. 6 illustrates a method of restoring a secret from two participants who hold a voice of 1 and a voice of 2, respectively, and reconstructing the secret, according to an embodiment of the present invention. Referring to FIG. 6, a result c of decrypting the secret collected from the two participants contains three errors with a voice of 1. The secret may be reconstructed by decoding the result c using an error correction and decoding algorithm.

Figure 7:
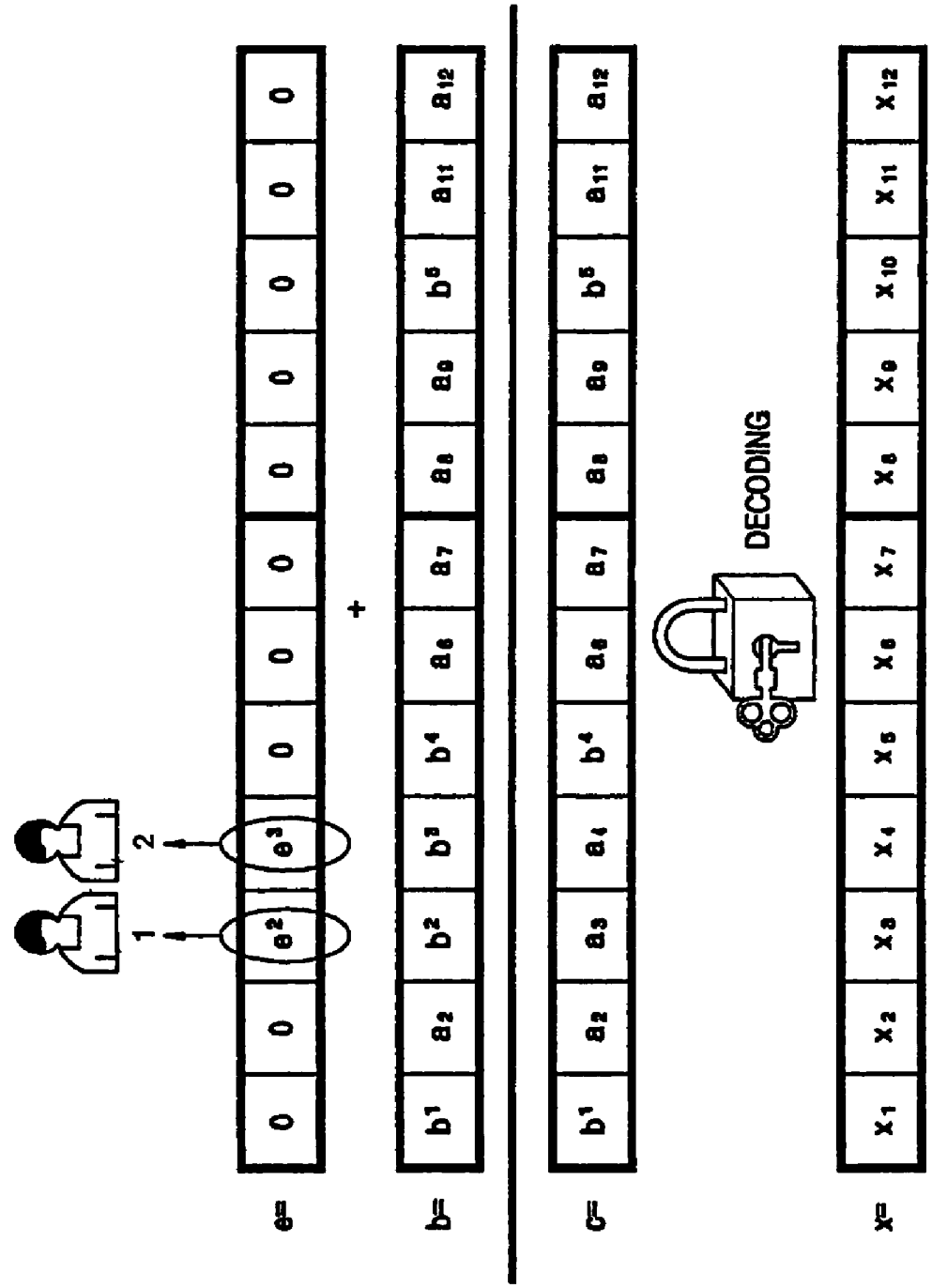
FIG. 7 is a schematic representation illustrating a process of collecting shares of a secret from two participants whose voices are 1, respectively, and attempting to reconstruct the secret, according to an embodiment of the present invention.

FIG. 7 illustrates a method of collecting a secret from two participants who each have a voice of 1, and attempting to reconstruct the secret, according to an embodiment of the present invention. Referring to FIG. 7, a result c of decrypting the secret collected from the two participants contains two errors with a voice of 1 and an error with a voice of 2. In this case, since a total weight of voices equals 4, which exceeds a weight of 3, which is a highest total number that would enable error correction, the secret may not be reconstructed using the error correction and decoding algorithm of the present invention. In other words, the secret may be reconstructed using the present invention only when a number of correctable errors is equal to, or larger than, a weight of errors reflecting the voices.

The present invention may be embodied as a program stored on a computer readable medium that can be run on a general computer. Here, the computer readable medium includes, but is not limited to, storage media such as magnetic storage media (e.g., ROM's, floppy disks, hard disks, and the like), optically readable media (e.g., CD-ROMs, DVDs, etc.), and carrier waves (e.g., transmission over the Internet). The present invention may also be embodied as a computer readable program code unit stored on a computer readable medium, for causing a number of computer systems connected via a network to affect distributed processing.

As described above, according to the present invention, a scheme may be realized wherein a weight of secret share does not depend on its size by using an error correcting code with an unequal error correction capability. Further, a weighted secret sharing scheme according to the present invention provides a constructive method to utilize parameters of a (K, N) weighted secret sharing scheme to share and reconstruct a secret.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of sharing a secret, comprising:
using a computer to perform the operations of:
encoding the secret using a predetermined code;
producing voices so that different weights are assigned to errors in an error vector according to locations of the errors in the error vector; and
encrypting the encoded secret using the error vector and distributing the encrypted encoded secret to a plurality of participants N,
wherein code blocks are determined by a generator polynomial of the predetermined code, and the predetermined code has a codeword which concatenates the code blocks with different lengths together, and wherein the voices are set to assign the different weights to the errors, which correspond to each code block in the error vector,
so that different weights are given to errors in an error vector according to locations of the errors,
the error vector e is known to the plurality of participants N, code parameters are selected to make a (K,N) threshold secret sharing scheme realizable, where N= a number of secret shares of the secret distributed to the N participants, N=wt(e) wherein a weight (wt) $\tau_i$(i=1, 2, 3..., N) is given to each secret share $s_i$ according to a location i in the error vector, as set forth in Equation 1 below:

$$T = \sum_{i=1}^{N} \tau_i, \qquad (1)$$

(d−1) or less errors are to be corrected, wherein a number of participants required to reconstruct the secret is at least K that satisfies wt(e)−K≦(d−1)/2 or 2K≧2 wt(e)−d+1, a minimum distance is d≦deg g(x)+1 when using Goppa code, and the minimum distance is d≦2(deg g(x))+1 when using binary Goppa code with a separable Goppa polynomial g(x), wherein for a generalized Goppa code, the minimum distance is estimated using the generalized Goppa code with a Goppa polynomial g(x) and a locator set L, and an arbitrary error set T={$t_1, t_2, \ldots, t_l$} that satisfies following Equation (2) with respect to the respective code blocks $a_1^{(l)} a_2^{(l)} \ldots a_{n_l}^{(l)}$ is corrected:

$$(\deg g(x))/2 \geq t_1\tau_1 + t_2\tau_2 + \ldots + t_l\tau_l \qquad (2),$$

wherein $t_1, t_2, \ldots,$ and $t_l$ denote numbers of errors contained in the code blocks with lengths of $n_1, n_2, \ldots,$ and $n_l$, respectively, and wherein in a generalized binary Goppa code, (deg g(x))/2 presented in Equation (2) is converted into (2 deg g(x))/2.

2. A method of reconstructing a secret distributed to participants after encoding the secret using an encoded secret, generating voices so that different weights are assigned to errors in an error vector, and encrypting the encoded secret using the error vector, the method comprising:
using a computer to perform the operations of:
determining a number of voices required to decode the code;
selecting a portion of the participants according to the determined number of voices;
collecting the encrypted encodedsecret from the selected portion of the participants; and
reconstructing the secret by decrypting and error-correction decoding the encrypted encoded secret,
wherein the different weights are given to the errors in the error vector e according to locations of the errors,
and using a generalized Goppa code to correct errors, a number of voices allocated to the participants is determined by a degree of a locator, wherein the degree of the locator corresponds to a location j of an error in the error vector e and is known to the participants, a (k,T) or (K,N) weighted secret sharing scheme is realized according to the following: T denotes a total number of voices used in the scheme and is equivalent to a weight given to the error vector e such that T=$t_1\tau_1 + t_2\tau_2 + \ldots + t_l\tau_l$, wherein $t_j$ denotes a number of non-zero values of the error vector e that corresponds to locations of locator polynomials with a degree of $\tau_j$, N denotes a number of the participants that is equal to a sum of $t_1, t_2, \ldots,$ and $t_l$, k denotes a minimum number of voices required for secret reconstruction that is equal to a sum of $t_1\tau_1, t_2\tau_2, \ldots,$ and $t_l\tau_l$, $k_i$ denotes a number of participants with voices of $\tau_i$ that is equal to or larger than T−(deg g(x))/2, and in a case of a binary Goppa code with a separable Goppa polynomial, $k \geq T-(\deg g(x))$, K denotes a minimum number of participants required for secret reconstruction wherein the minimum number is equal to a sum of $k_1, k_2, \ldots,$ and $k_l$.

3. The method of claim 2, wherein the determined number of voices is a sum of values obtained by summing products obtained by multiplying numbers of participants having the generated voices by corresponding voices, respectively.

4. The method of claim 2, wherein, when a number of errors remaining after the decrypting multiplied by each voice is greater than or equal to a sum of products of each error corresponding to the errors remaining, an error correction decoding is utilized to correct the errors remaining.

5. A method of sharing and reconstructing a secret, comprising:
   using a computer to perform the operations of:
   encoding the secret using a predetermined code;
   generating voices so that different weights are assigned to errors in an error vector according to locations of the errors in the error vector;
   encrypting the encoded secret using the error vector and distributing the encrypted encoded secret to participants;
   determining a number of voices required to decode the predetermined code;
   selecting a portion of the participants by the determined number of voices;
   collecting the encrypted encoded secret from the selected portion of the participants; and
   reconstructing the secret by decrypting and error-correction decoding the encrypted encoded secret,
   wherein code blocks are determined by a generator polynomial of the code, and the encoded secret has a codeword which concatenates the code blocks with different lengths together, and wherein the voices are determined so that different weights are assigned to the errors, which correspond to each code block in the error vector,
   the error vector e is known to the participants, code parameters are selected to make a (K,N) threshold secret sharing scheme realizable, where N=a number of secret shares of the secret distributed to the N participants, N=wt(e) wherein a weight (wt) $\tau_i$ (i =1,2, 3 ..., N) is given to each secret share $s_i$ according to a location i in the error vector, as set forth in Equation (1) below:

$$T = \sum_{i=1}^{N} \tau_i, \quad (1)$$

(d−1) or less errors are to be corrected, wherein a number of participants required to reconstruct the secret is at least K that satisfies wt(e)−K≤(d−1)/2 or 2K≥2 wt(e)−d+1, a minimum distance is d≤deg g(x)+1 when using Goppa code, and the minimum distance is d≤2(deg g(x))+1 when using binary Goppa code with a separable Goppa polynomial g(x), wherein for a generalized Goppa code, the minimum distance is estimated using the generalized Goppa code with a Goppa polynomial g(x) and a locator set L, and an arbitrary error set T={$t_1, t_2, \ldots, t_l$} that satisfies following Equation (2) with respect to the respective code blocks $a_1^{(l)} a_2^{(l)} \ldots a_{n_l}^{(l)}$ is corrected:

$$(\deg g(x))/2 \geq t_1 \tau_1 + t_2 \tau_2 + \ldots + t_l \tau_l \quad (2),$$

wherein $t_1, t_2, \ldots,$ and $t_l$ denote numbers of errors contained in the code blocks with lengths of $n_1, n_2, \ldots,$ and $n_l$, respectively, and wherein in a generalized binary Goppa code, (deg g(x))/2 presented in Equation (2) is converted into (2 deg g(x))/2.

6. The method of claim 5, wherein the determined number of voices is a sum of values obtained by summing products obtained by multiplying voices generated, wherein the voices generated are the voices obtained so that different weights are assigned to errors in an error vector according to locations of the errors in the error vector, to correspond to the code blocks by numbers of participants having corresponding voices, respectively.

7. The method of claim 5, wherein a total number of the voices is a sum of values obtained by summing products obtained by multiplying weights assigned to the code blocks, wherein the weights assigned are the different weights that are assigned to errors in an error vector according to locations of the errors in the error vector, and the voices corresponding to the code blocks, respectively.

8. The method of claim 5, wherein the error correction decoding corrects a number of errors when the number of errors is greater than or equal to a sum of products of each error remaining after the decrypting by each voice corresponding to the remaining errors.

9. A computer-readable storage medium having embodied thereon a computer program to share a secret, the computer program executing:
   encoding the secret using a predetermined code;
   producing voices so that different weights are assigned to errors in an error vector according to locations of the errors in the errors in the error vector; and
   encrypting the encoded secret using the error vector and distributing the encrypted encoded secret to a plurality of participants,
   wherein code blocks are determined by a generator polynomial of the predetermined code, and the predetermined code has a codeword which concatenates the code blocks with different lengths together, and wherein the voices are set to assign different weights to the errors, which correspond to each code block in the error vector, so that different weights are given to errors in an error vector according to locations of the errors,
   the error vector e is known to the plurality of participants, code parameters are selected to make a (K,N) threshold secret sharing scheme realizable, where N=a number of secret shares of the secret distributed to the N participants, N=wt(e) wherein a weight (wt) $\tau_i$ (i=1, 2, 3 ..., N) is given to each secret share $s_i$ according to a location i in the error vector, as set forth in Equation (1) below:

$$T = \sum_{i=1}^{N} \tau_i, \quad (1)$$

(d−1) or less errors are to be corrected, wherein a number of participants required to reconstruct the secret is at least K that satisfies wt(e)−K≤(d−1)/2 or 2K≥2 wt(e)−d+1, a minimum distance is d≤deg g(x)+1 when using Goppa code, and the minimum distance is d≤2(deg g(x))+1 when using binary Goppa code with a separable Goppa polynomial g(x), wherein for a generalized Goppa code, the minimum distance is estimated using the generalized Goppa code with a Goppa polynomial g(x) and a locator set L, and an arbitrary error set T={$t_1, t_2, \ldots, t_l$} that satisfies following Equation (2) with respect to the respective code blocks $a_1^{(l)} a_2^{(l)} \ldots a_{n_l}^{(l)}$ is corrected:

$$(\deg g(x))/2 \geq t_1 \tau_1 + t_2 \tau_2 + \ldots + t_l \tau_l \quad (2),$$

wherein $t_1, t_2, \ldots$, and $t_l$ denote numbers of errors contained in the code blocks with lengths of $n_1, n_2, \ldots$, and $n_l$, respectively, and wherein in a generalized binary Goppa code, (deg g(x))/2 presented in Equation (2) is converted into (2 deg g(x))/2.

10. A computer-readable storage medium having embodied thereon a computer program to reconstruct a secret distributed to participants after encoding the secret using an encoded secret, generating voices so that different weights are assigned to errors in an error vector, and encrypting the encoded secret using the error vector, the computer program executing:

determining a number of voices required to decode the code;
selecting a portion of the participants according to the determined number of voices;
collecting the encrypted encoded secret from the selected portion of the participants; and
reconstructing the secret by decrypting and error-correction decoding the encrypted encoded secret,
wherein the different weights are given to the errors in the error vector according to locations of the errors,
and using a generalized Goppa code to correct errors, a number of voices allocated to the participants is determined by a degree of a locator, wherein the degree of the locator corresponds to a location j of an error in the error vector e and is known to the participants, a (k,T) or (K,N) weighted secret sharing scheme is realized according to the following: T denotes a total number of voices used in the scheme and is equivalent to a weight given to the error vector e such that $T = t_1\tau_1 + t_2\tau_2 + \ldots + t_l\tau_l$, wherein $t_i$ denotes a number of non-zero values of the error vector e that corresponds to locations of locator polynomials with a degree of $\tau_1$, N denotes a number of the participants that is equal to a sum of $t_1, t_2, \ldots$, and $t_l$, k denotes a minimum number of voices required for secret reconstruction that is equal to a sum of $t_1\tau_1, t_2\tau_2, \ldots$, and $t_l\tau_l$, $k_i$ denotes a number of participants with voices of $\tau_i$ that is equal to or larger than T−(deg g(x))/2, and in a case of a binary Goppa code with a separable Goppa polynomial, k≧T−(deg g(x)), K denotes a minimum number of participants required for secret reconstruction wherein the minimum number is equal to a sum of $k_1, k_2, \ldots$, and $k_l$.

11. The computer-readable storage medium of claim 10, wherein the determined number of voices is a sum of values obtained by summing products obtained by multiplying numbers of participants having the generated voices by the corresponding voices, respectively.

12. The computer-readable storage medium of claim 10, wherein the error correction decoding corrects a number of errors when the number of errors is greater than or equal to a sum of products of each error remaining after the decrypting multiplied by each voice corresponding to the remaining errors.

13. A computer-readable storage medium having embodied thereon a computer program to share and reconstruct a secret, the computer program executing:

encoding the secret using a predetermined code;
generating voices so that different weights are assigned to errors in an error vector according to locations of the errors in the error vector;
encrypting the encoded secret using the error vector and distributing the encrypted encoded secret to participants;
determining a number of voices required to decode the predetermined code;
selecting a portion of the participants by the determined number of voices;
collecting the encrypted encoded secret from the selected portion of the participants; and
reconstructing the secret by decrypting and error-correction decoding the encrypted encoded secret,
wherein code blocks are determined by a generator polynomial of the code, and the encoded secret has a codeword which concatenates the code blocks with different lengths together, and wherein the voices are determined so that different weights are assigned to the errors, which correspond to each code block in the error vector so that different weights are assigned to the errors, which correspond to each code block in the error vector,
the error vector e is known to the participants, code parameters are selected to make a (K,N) threshold secret sharing scheme realizable, where N= a number of secret shares of the secret distributed to the N participants, N=wt(e) wherein a weight (wt) $\tau_i$(i=1, 2, 3 ..., N) is given to each secret share $s_i$ according to a location i in the error vector, as set forth in Equation (1) below:

$$T = \sum_{i=1}^{N} \tau_i, \tag{1}$$

(d−1) or less errors are to be corrected, wherein a number of participants required to reconstruct the secret is at least K that satisfies wt(e)−K≦(d−1)/2 or 2K≧2 wt(e)−d+1, a minimum distance is d≦deg g(x)+1 when using Goppa code, and the minimum distance is d≦2(deg g(x))+1 when using binary Goppa code with a separable Goppa polynomial g(x), wherein for a generalized Goppa code, the minimum distance is estimated using the generalized Goppa code with a Goppa polynomial g(x) and a locator set L, and an arbitrary error set $T = \{t_1, t_2, \ldots, t_l\}$ that satisfies following Equation (2) with respect to the respective code blocks $a_1^{(I)} a_2^{(I)} \ldots a_{n_l}^{(I)}$ is corrected:

$$(\deg g(x))/2 \geq t_1\tau_1 + t_2\tau_2 + \ldots + t_l\tau_l \tag{2},$$

wherein $t_1, t_2, \ldots$, and $t_l$ denote numbers of errors contained in the code blocks with lengths of $n_1, n_2, \ldots$, and $n_l$, respectively, and wherein in a generalized binary Goppa code, (deg g(x))/2 presented in Equation (2) is converted into (2 deg g(x))/2.

14. The computer-readable storage medium of claim 13, wherein the determined number of voices is a sum of values obtained by summing products obtained by multiplying voices generated", wherein the voices generated are the voices obtained so that different weights are assigned to errors in an error vector according to locations of the errors in the error vector," to correspond to code blocks by numbers of participants having corresponding voices, respectively.

15. The computer-readable storage medium of claim 13, wherein a total number of the voices is a sum of values obtained by summing products obtained by multiplying weights assigned to the code blocks and the voices corresponding to code blocks, respectively.

16. The computer-readable storage medium of claim 13, wherein, when a number of errors remaining after the decrypting multiplied by each voice is greater than or equal to a sum of products of each error corresponding to the errors remaining, an error correction decoding is utilized to correct the errors remaining.

* * * * *

UNITED STATES PATENT AND TRADEMARK OFFICE
CERTIFICATE OF CORRECTION

| | | |
|---|---|---|
| PATENT NO. | : 7,551,740 B2 | Page 1 of 1 |
| APPLICATION NO. | : 10/960278 | |
| DATED | : June 23, 2009 | |
| INVENTOR(S) | : Kyung-hee Lee et al. | |

It is certified that error appears in the above-identified patent and that said Letters Patent is hereby corrected as shown below:

Column 8, Line 21, change "codewith" to --code with--.

Column 8, Line 45, change "encodedsecret" to --encoded secret--.

Column 10, Line 31, change "errors in the errors" to --errors--.

Column 12, Line 49, change "generated", wherein" to --generated, "wherein--.

Signed and Sealed this

Third Day of November, 2009

David J. Kappos
*Director of the United States Patent and Trademark Office*